Patented June 25, 1935

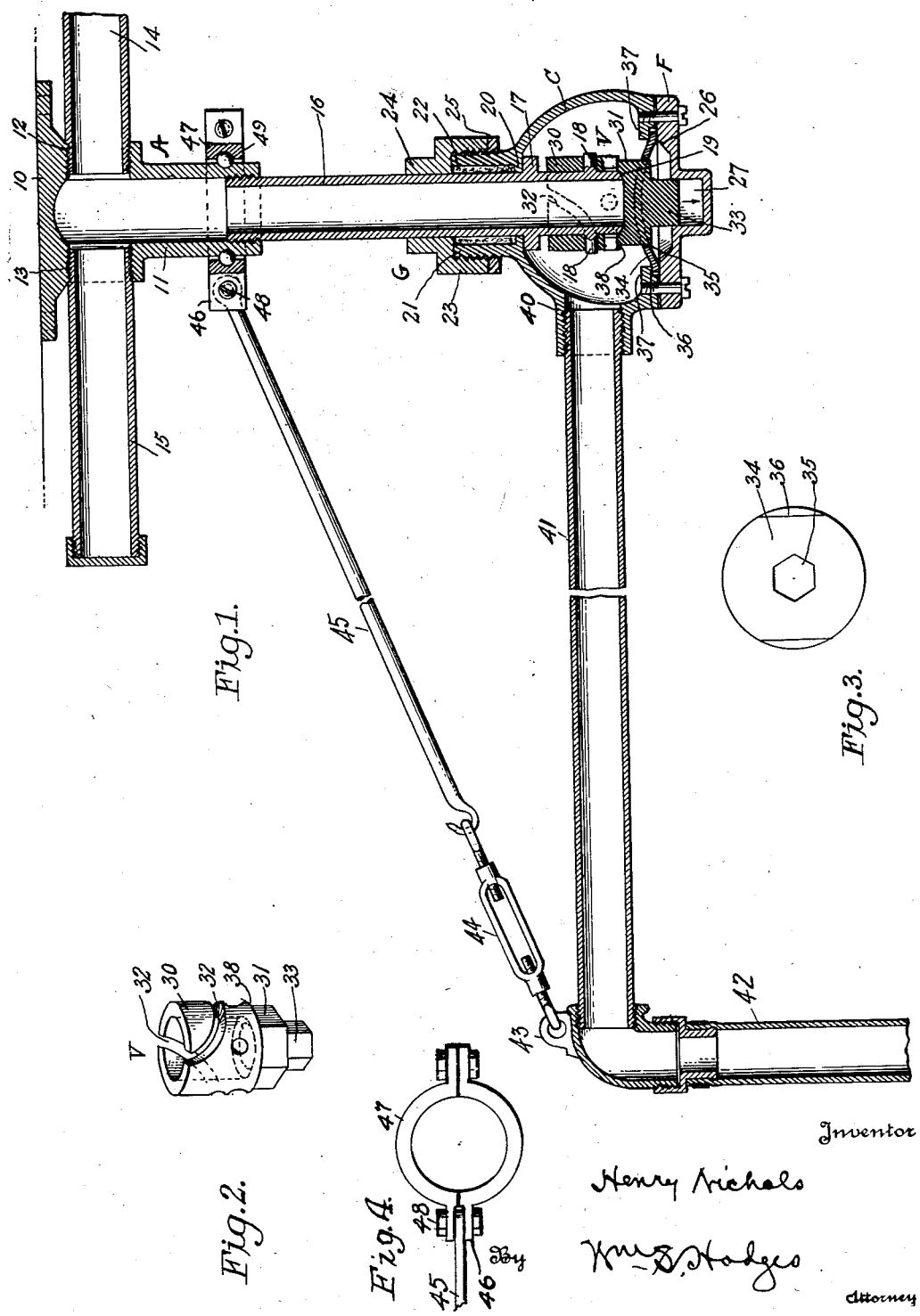

2,006,029

UNITED STATES PATENT OFFICE 2,006,029

VEHICLE WASHING APPARATUS

Henry Nichols, New York, N. Y.

Application December 5, 1932, Serial No. 645,868

5 Claims. (Cl. 251—8)

This invention is a fluid-flow control device primarily adapted for use with an apparatus for washing vehicles, but not limited to such use.

One of the objects is to provide a device of the character mentioned, which may be associated with an apparatus so constructed and arranged that water may be selectively delivered to various points in a zone surrounding a centrally located connection with a source of supply, so as to facilitate the washing of a vehicle standing within said zone. A further object is to provide a flow-control device which may be operated by a radially disposed delivery pipe connected with a coupling member, which in turn is rotatively connected with the supply pipe. A further object is to provide simple means for rotatively mounting the flow-control upon, and maintaining its axial alinement with respect to the supply pipe.

The invention will be hereinafter fully set forth and particularly pointed out in the claims.

In the accompanying drawing:—

Figure 1 is a vertical sectional view illustrating a vehicle washing apparatus constructed in accordance with the invention. Figure 2 is a perspective view illustrating the control valve. Figure 3 is a top plan view illustrating the spring washer for the control valve. Figure 4 is a detail view illustrating the supporting ring.

Referring to the drawing, A designates a T-coupling having a supporting flange 10, outlet branch 11, and two oppositely disposed inlet branches 12 and 13. Said bracket may be secured in any desired manner to a ceiling or other overhead support. The inlet pipe 14 leading from the source of supply is connected with the branch 12 of said coupling, and in the form illustrated in Figure 1, the branch 13 is closed by an air chamber 15. The said air chamber 15 normally retains sufficient air to prevent knocking and vibration on the supply pipe upon the sudden arresting of the flow of water through the apparatus.

A depending column or pipe 16 is removably connected to the outlet branch of the T-coupling A in suitable manner, as by means of screw threads, and it is provided with an annular supporting shoulder 17, and a plurality of radially disposed pins 18. Its lower end is shaped to provide a valve seat, as indicated at 19. In practice the T-coupling A and the pipe of column 16 in effect, constitute a supply conduit.

Rotatively mounted on the pipe 16 is a combined coupling member and valve chamber C, the same comprising a globular chamber, having an inwardly extended annular flange 20 resting upon the flange 17, and provided with an axially extended sleeve 21, which is externally threaded and of an inner diameter larger than the external diameter of the pipe 16. The space 22 between the sleeve 21 and the pipe 16 constitutes a stuffing box which is closed by a gland-like member G, having an internally threaded sleeve 23 engaging the threads of the sleeve 21, and a bearing sleeve 24 rotatively engaging the pipe 16. Relative rotation of the casing C and the member G is normally prevented in any desired manner, a lock nut 25 being shown for purposes of illustration, said nut and bearing and the end of sleeve 23 engaging the threaded portion of the sleeve 21. The casing C is normally closed by a removable bottom plate 26, which is provided with a guide sleeve 27 of angular cross section.

Located within the casing C is a valve member V, provided with a sleeve 30 slidably and rotatively mounted on the lower end of the pipe 16, and formed with a solid valve portion 31 complemental to the seat 19. Said sleeve is provided with helical grooves 32 engaging the pins 18, and the bottom of the valve portion is provided with a guide member 33 complemental to and slidably engaging the sleeve 27. Suitable outlet openings X are also provided in the valve sleeve 30. The valve is normally held to its seat by suitable yieldable means, such as a spring washer 34 having a central opening 35, the periphery of said washer having oppositely arranged offset lips 36. Said opening is of angular contour to engage a similarly shaped portion of the valve member V, and the washer is offset so that the flanges or lips 36 may be engaged with overhanging shoulders 37 formed in the casing C, and the offset portion may engage the underside of a flange 38 formed on the valve member.

In practice, the spring washer 34 normally holds the valve member against the seat 19, so as to shut off the flow of water. Relative rotative movement imparted to the casing C will cause the valve member V to also rotate upon the pipe 16 because of the engagement of sleeve 27 and guide member 33, the effect of the reaction between the pins 18 and slots 32 being to move the valve member longitudinally along the pipe away from the valve seat 19, thereby permitting water to flow in a volume corresponding to the extent of unseating of the valve.

The casing C is provided with a discharge opening 40, in which is secured one end of a discharge pipe 41 extending horizontally from the casing in a radial direction, said discharge pipe being provided at its outer free end with means by which it may be connected to a flexible hose 42, through which the water is discharged. The outer end of the pipe 40 is provided with an eye 43, to which is connected a turnbuckle 44. A rod 45 has one end connected with said turnbuckle 45, and the other end of said rod is extended into the widened space between flanges 46 of a split supporting ring 47, rotatively mounted on the branch 11 of coupling A, said end being provided with an eye engaging one of the bolts 48 which retain the sections of the said collar together. The split sleeve 47 and the rod 45 connecting said sleeve with the discharge pipe 41 serve to maintain the proper axial relation of the discharge member 16, the valve chamber C and the rotatably and slidably movable valve, so that there is no cramping or binding of the parts during rotation of the chamber upon the pipe 16, with the result that the valve operation is smooth and positive and binding thereof during its movements is prevented.

In order to reduce friction on the parts during rotation, antifriction members 49 are interposed between collar 47 and the branch member 11, the outer surface of said branch member 11 and the inner surface of collar 47 being preferably grooved as shown, to provide a race for said antifriction members.

In operation, water is normally free to flow through the pipe 14, branch 11, and pipe 16, but its flow is normally interrupted by the valve member V. By pulling on the hose 42 and pipe 41 in a direction to rotate the casing C to the right, for instance, the valve member V will be unseated and held in this position against the pressure of washer 34, by the reaction of the pins 18 and slots 32, thereby permitting water to flow out of the pipe 16 into casing C, and from thence outwardly through the discharge pipe 41 and hose 42. Obviously the volume of outflow will depend upon the extent of rotative movement applied to said casing. Upon rotation of the casing C in the opposite direction the valve is moved to seated position, the tension of washer 34 aiding the closing movement.

The advantages of the invention will be readily appreciated by those skilled in the art to which the invention belongs. For instance, it will be particularly noted that water may be delivered at various positions within a zone around the centrally located supporting pipe through which the water is supplied, so that the operator may move all around a standing vehicle and always have at hand an adequate supply of water for washing the vehicle. It will also be seen that by the arrangement shown the axial alignment of the valve chamber C with the supporting pipe, during rotation of the parts, is always maintained, and yet the parts will move freely without sticking. It will also be noted that a very simple arrangement has also been provided, by means of which rotative movement of the casing will control the flow of water to the discharge pipe.

Having thus explained the nature of the invention and described an operative manner of constructing and using the same, although without attempting to set forth all of the forms in which it may be made, or all of the forms of its use, what is claimed is:—

1. In a washing machine, a normally fixed supply conduit having a discharge end, a valve casing rotatively engaging said conduit and enclosing said discharge end, said valve casing having an outlet, a valve sleeve rotatively mounted on and enclosing the discharge end of said conduit, said valve sleeve having a closed end and also having outlet passages therein, means for preventing axial movement of said casing with respect to said conduit, means for so connecting the valve casing and the valve sleeve that rotative movement of said casing will impart corresponding rotative movement to the valve sleeve, means constructed and arranged to impart axial movements to said sleeve during rotation thereof in such manner as to move the closed end of the valve sleeve toward and from the discharge end of the conduit, and yieldable means located within said casing and constructed and arranged to normally press said closed end of the valve sleeve against the discharge end of the supply conduit.

2. In a washing apparatus, a normally fixed supply conduit having a discharge end, a valve casing rotatively engaging said discharge conduit and having a discharge outlet, means for preventing axial movement of said casing with respect to said conduit, a valve sleeve rotatively mounted on and enclosing the discharge end of said conduit and having a closed end, a removable cap for said valve casing, means for so connecting said cap and said valve sleeve that rotative movement of the casing imparts corresponding rotative movements to the valve sleeve, means constructed and arranged to impart axial movements to said sleeve during rotation thereof in such manner as to move the closed end thereof toward and from the discharge end of the supply conduit, and a spring washer retained in position within said casing by said cap, said washer being so constructed and arranged as to apply a yieldable axial pressure upon said valve sleeve toward the discharge end of the supply conduit.

3. In a washing apparatus, a normally fixed supply conduit having a discharge end, a valve casing rotatively engaging said discharge conduit and having a discharge outlet, means for preventing axial movement of said casing with respect to said conduit, a valve sleeve rotatively mounted on and enclosing the discharge end of said conduit and having a closed end, a removable cap for said valve casing, said cap having an angular depression therein, said valve sleeve having a guide portion complemental to said depression, said guide portion and said depression being so constructed and arranged as to cause the valve sleeve to rotate with the valve casing, and a yieldable member within said valve casing so constructed and arranged as to normally apply a yieldable axial pressure to said valve sleeve toward the discharge end of the supply conduit.

4. In a washing apparatus, a normally fixed supply conduit having a discharge end, a valve casing rotatively engaging said supply conduit and enclosing the discharge end thereof, said casing having a discharge outlet, a valve sleeve rotatively mounted on and enclosing the discharge end of said conduit, said valve sleeve having a closed end and also having discharge openings therein, means for so connecting the valve casing and the valve sleeve that rotative movement of the discharge conduit imparts corresponding rotative movements to the valve sleeve, means constructed and arranged to impart axial movements to the valve sleeve during rotation thereof in such manner as to move the closed end of the valve sleeve toward and from the discharge end of the supply conduit, and a spring plate having edge portions anchored within the valve chamber and provided with an offset central portion constructed and arranged to engage the valve sleeve in such manner as to normally urge the same axially toward the discharge end of the supply conduit.

5. In a washing apparatus, a normally fixed supply conduit having a discharge end provided with radially disposed pins, a valve casing rotatively engaging said supply conduit and enclosing the discharge end thereof, said valve casing having a discharge outlet, means for preventing axial movement of the casing with respect to the supply conduit, a valve sleeve rotatively engaging said supply conduit and enclosing the discharge end thereof, said valve sleeve having discharge outlets and a closed end, said valve sleeve also having helical slots engaging said pins, means for so connecting the valve casing and the valve sleeve that rotative movements of the valve casing imparts corresponding rotative movements to the valve sleeve, whereby the pin and slot connection between the valve sleeve and the discharge conduit causes the closed end of the valve sleeve to move toward and from the discharge end of the supply conduit, and a spring disk located within the valve casing for engaging the valve sleeve in such manner as to apply axial tension thereto toward the discharge end of the supply conduit.

HENRY NICHOLS.